(12) United States Patent
Raffle et al.

(10) Patent No.: US 8,908,003 B2
(45) Date of Patent: Dec. 9, 2014

(54) REMOTE COMMUNICATION SYSTEM AND METHOD

(75) Inventors: Hayes Raffle, Palo Alto, CA (US);
Koichi Mori, San Jose, CA (US);
Mirjana Spasojevic, Palo Alto, CA (US); Rafael Ballagas, Palo Alto, CA (US); Hiroshi Horii, Palo Alto, CA (US); Glenda Revelle, Fayetteville, AR (US)

(73) Assignee: Nokia Corporation, Espoo (FI)

( * ) Notice: Subject to any disclaimer, the term of this patent is extended or adjusted under 35 U.S.C. 154(b) by 907 days.

(21) Appl. No.: 12/562,037

(22) Filed: Sep. 17, 2009

(65) Prior Publication Data
US 2011/0063404 A1 Mar. 17, 2011

(51) Int. Cl.
*H04N 7/14* (2006.01)
(52) U.S. Cl.
USPC .................. 348/14.01; 348/14.05; 348/14.08
(58) Field of Classification Search
USPC ........................................................ 348/14.01
See application file for complete search history.

(56) References Cited

U.S. PATENT DOCUMENTS

| 6,297,812 B1 | 10/2001 | Ohara et al. |
| 6,655,586 B1 | 12/2003 | Back et al. |
| 7,261,612 B1 | 8/2007 | Hannigan |
| 7,262,788 B2 * | 8/2007 | Ono et al. .................. 348/14.09 |
| 2002/0145626 A1 | 10/2002 | Richards et al. |
| 2003/0175672 A1 | 9/2003 | Kim et al. |
| 2008/0067231 A1 | 3/2008 | Song |
| 2008/0209075 A1 | 8/2008 | Shamma |
| 2009/0225788 A1 | 9/2009 | Kephart |

FOREIGN PATENT DOCUMENTS

| JP | 4044155 A | 2/1992 |
| JP | H05-137846 A | 6/1993 |
| JP | H07-162824 A1 | 6/1995 |
| JP | 2000 092217 A | 3/2000 |
| JP | 2001 249924 A | 9/2001 |
| JP | 2003 280679 A | 10/2003 |
| JP | 2005 091769 A | 4/2005 |
| JP | 2005 141284 A | 6/2005 |
| JP | 2005 242176 A | 9/2005 |
| JP | 2006 081005 A | 3/2006 |
| JP | 2006 238251 A | 9/2006 |

(Continued)

OTHER PUBLICATIONS

Raffle, H., et al. "Storyplay: Reading with Young Children (and Elmo) Over a Distance." Unpublished draft, 2010 ACM.

(Continued)

*Primary Examiner* — Suhan Ni
(74) *Attorney, Agent, or Firm* — Alston & Bird LLP

(57) ABSTRACT

A method comprises determining a status of an object on a first device and sending an indicator of the status of the object to a remote device, the indicator being configured to allow the remote device to present the status of the object. The method may further comprise establishing audio and video communication with the remote device. The audio and video communication with the remote device may be established over a network. The object may be a book, and the status may be associated with a page number of the book. The method may further comprise displaying animated content based on the determined status of the object. The displaying of animated content may include displaying an animated character providing commentary or asking questions related to content associated with the object.

18 Claims, 6 Drawing Sheets

(56) References Cited

FOREIGN PATENT DOCUMENTS

| JP | 2009-145883 A | 7/2009 |
|---|---|---|
| WO | WO-01/11588 A2 | 2/2001 |
| WO | WO 2008047350 A2 | 4/2008 |

OTHER PUBLICATIONS www.portal.acm.org/citation.cfm?id=365031.
www.storyreader.com.
PCT International Search Report for PCT Application PCT/IB2010/002326, Feb. 9, 2011.
Office Action for Canadian Application No. 2,774,466; dated Aug. 20, 2013.
Back, M, et al.; "*Listen reader: an electronically augmented paper-based book*;" Conference on Human Factors in Computing Systems, Proceedings of the SIGCHI conference on Human factors in computing systems; pp. 23-29; dated 2001; abstract retrieved on Jan. 19, 2010 from <http://pportal.acm.org/citation.cfm?id=365031>.
Raffle, H., et al.; *Storyplay: Reading with Young Children (and Elmo) Over a Distance*; Unpublished Draft, Nokia Research Center & Joan Ganz Center at Sesame Workshop; dated 2010.
"*Story Reader*;" Story Reader Electronic Learn-to-Read Storybooks; p. 1; dated 2007; retrieved on Jan. 19, 2010 from <http://www.storyreader.com/cgi-bin/showHome.cgi?SITEID=1&ITEM=HOME>.
Office Action from related Chinese Patent Application No. 201080049988.0, dated Mar. 7, 2014.
Office Action for Korean Application No. 2012-7009668 dated May 24, 2014.
Office Action for Japanese Application No. 2012-529353 dated Oct. 4, 2013.
International Preliminary Report on Patentability with Written Opinion for Application No. PCT/IB2010/002326 dated Mar. 20, 2012.
Office Action for U.S. Appl. No. 13/175,713 dated Jul. 24, 2014.
Office Action from Russian Application No. 2012114925, dated Aug. 1, 2014.
Office Action for Japanese Application No. 2012-529353 dated Oct. 6, 2014.

\* cited by examiner

REMOTE COMMUNICATION SYSTEM AND METHOD

BACKGROUND OF THE INVENTION

The present invention relates generally to the field of electronic communication and, more particularly, to devices and methods for remote communication associated with an object.

SUMMARY OF THE INVENTION

One aspect of the invention relates to a method comprising determining a status of an object on a first device and sending an indicator of the status of the object to a remote device, the indicator being configured to allow the remote device to present the status of the object.

In one embodiment, the method further comprises establishing audio and video communication with the remote device. The audio and video communication may be part of a video conference session. The audio and video communication with the remote device may be established over a network.

In another embodiment, the method further comprises recording audio and video content and later communicating this content with the remote device. The audio and video content may be part of a recorded movie. The recorded content may be communicated to the remote device over a network.

In one embodiment, the object is a physical object. The object may be a book, and the status may be associated with a page number of the book.

In one embodiment, the object is a virtual object. The object may be an electronic book.

In one embodiment, the status is a physical state of the object.

In one embodiment, the object is a book, and the status is a page number of the book.

In one embodiment, the object is a book, and the status is selected content in the book.

In one embodiment, the method further comprises displaying animated content based on the determined status of the object. The displaying of animated content may include displaying an animated character providing commentary or asking questions related to content associated with the object.

In another aspect of the invention, a method comprises receiving an indicator of a status of an object at a remote device; determining the status of the object at the remote device based on the received indicator; and presenting the status of the object to a user.

In another aspect, the invention relates to an apparatus comprising at least one processor and at least one memory including computer program code. The at least one memory and the computer code are configured to, working with the at least one processor, cause the apparatus to perform at least the following: determining a status of an object on a first device; and sending an indicator of the status of the object to a remote device, the indicator being configured to allow the remote device to present the status of the object.

In one embodiment, the object is a book and the apparatus further comprises a receptacle for receiving a book therein.

In one embodiment, the apparatus further comprises one or more sensors configured to determine the status of the book.

In another aspect of the invention, a method comprises determining a status of an object on a first device at one or more time points; recording an indicator of the status at the one or more time points as a session; and sending the session to a remote device, the indicators in the session being configured to allow the remote device to determine the status of the object. In one embodiment, the session further includes audio and video content.

In another aspect, a method comprises receiving a recorded session from a remote device, the session comprising indicators of one or more statuses of an object, the session further comprising audio and video content associated with each of the one or more statuses of the object; and detecting a current status the object; and playing the audio and video content associated with the detected current status of the object.

In another aspect, the invention relates to a method comprising recording audio and video content related to an object; associating each of one or more portions of the audio and video content with a status of the object; and storing the audio and video content and the association of the audio and video content on a storage media. In one embodiment, the method further comprises detecting the status of the object during recording of the audio and video content.

In another aspect, a method comprises detecting a current status of an object; determining an association of the detected current status with a portion of a recorded audio and video content; and playing the portion of the audio and video content associated with the detected current status of the object.

DETAILED DESCRIPTION OF THE PREFERRED EMBODIMENTS

Long distance families often desire to connect via remote shared experiences. Currently, telephone and video conferencing technologies are used for young and old members to connect over a distance via shared conversations or play.

Embodiments of the present invention provide for, among other possibilities, a remote shared document reading experience. For example, a user interface may provide information related to the physical state of the other participant's document. In this regard, a video conferencing system may be incorporated with a physical document reader and communications system to share the state of the documents. Further, a conversational software agent, such as an animated character (e.g., Sesame Street®'s Elmo), may be provided by the user interface to meet young children's developmental stages.

Embodiments of the present invention may apply to a variety of distance-collaboration activities, such as distance learning for all ages of users. Embodiments of the present invention sense the state of a document and transmit an indicator of the sensed state to a remote device for document display on the remote device, for example.

Figure 1:
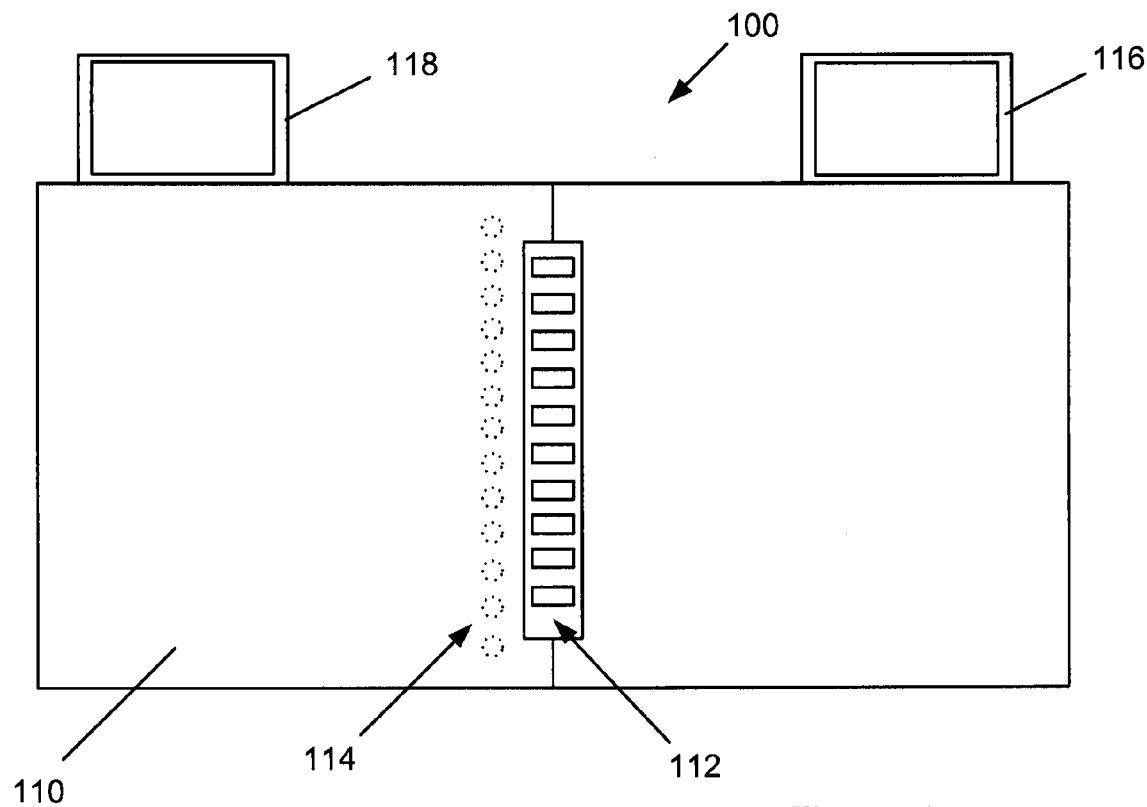
FIG. 1 illustrates an example apparatus according to an embodiment of the present invention.

Referring now to FIG. 1, an example apparatus according to an embodiment of the present invention is illustrated. The illustrated apparatus 100 includes a book frame 110 with a receptacle 112 for receiving a book therein. The book frame 110 may be formed from a variety of materials, such as wood, plastic or other such materials. Further, the book frame 110 may be foldable in a manner similar to a book.

The receptacle 112 is configured to receive a binding of a book therein. In this regard, the receptacle 112 may include a series of grooves to receive corresponding spirals or rings of a book binding, for example. The receptacle 112 and the grooves may be sized to accommodate certain books, for example.

The book frame 110 may be provided with a mechanism for detecting a status of a book that is positioned in the receptacle 112. In the illustrated embodiment, this mechanism comprises a series of magnetic sensors 114 embedded within the body of the book frame 110. The magnetic sensors 114 are configured to sense corresponding magnets in a book, as described in greater detail below.

In various embodiments of the present invention, the apparatus 100 further includes one or more video displays 116, 118 operatively coupled to the book frame 110. In the illustrated embodiment, two video displays 116, 118 are provided. In other embodiments, fewer or greater number of such displays may be provided. In various embodiments, the video displays 116, 118 comprise touch screens configured to receive input from a user through a touch. In other embodiments, other mechanisms for receiving user input, such as one or more keys, may be provided.

Figure 2:
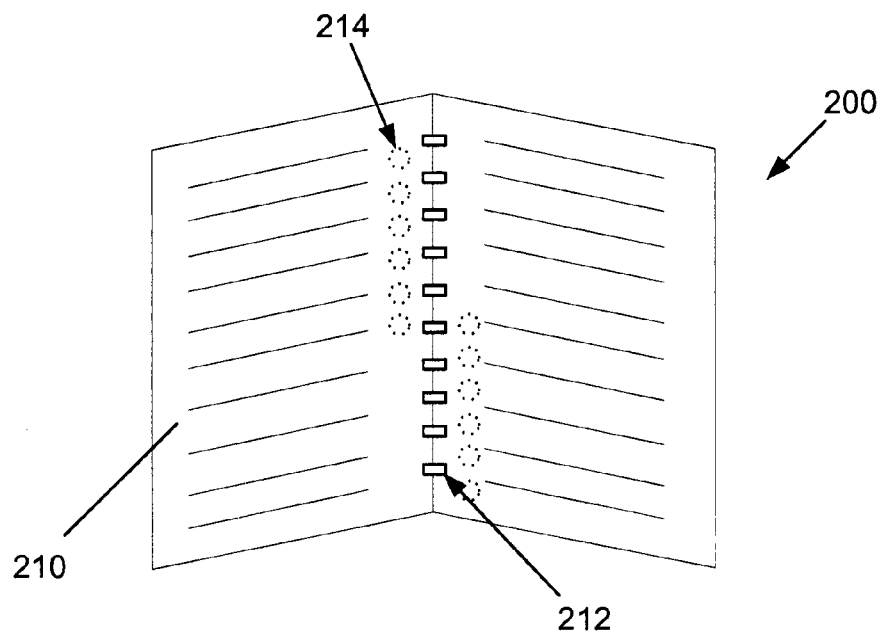
FIG. 2 illustrates a book for use with the apparatus of FIG. 1.

Referring now to FIG. 2, an embodiment of a book for use with the apparatus of FIG. 1 is illustrated. The book 200 includes a plurality of pages 210 with text, graphics or other content printed thereon. The pages 210 are secured to each other by a binding 212 which may comprise, for example, rings or spirals.

Each page in the plurality of pages 210 may include one or more magnet 214 embedded therein. The magnets 214 are configured to uniquely identify the page to which the book 200 is open.

Figure 3:
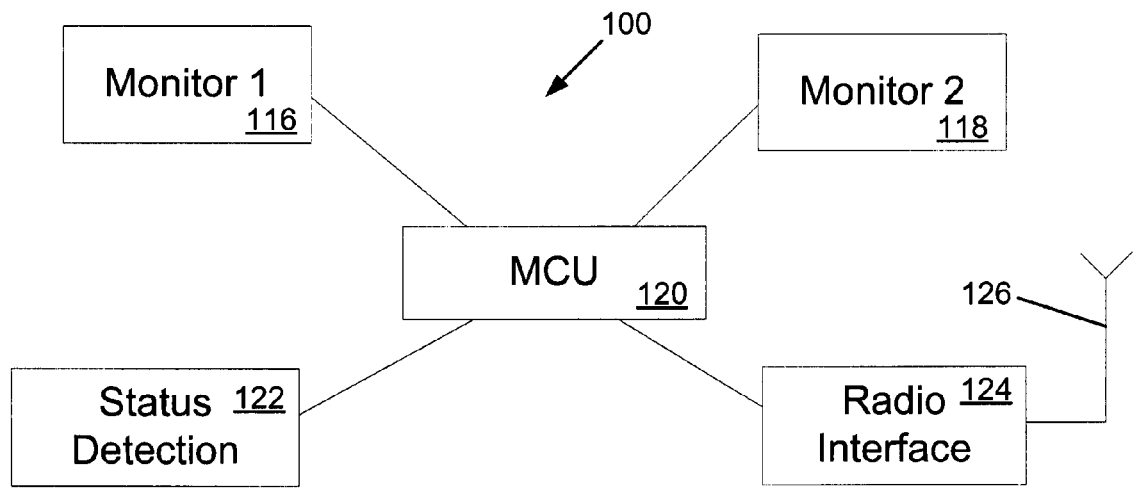
FIG. 3 is a schematic illustration of the apparatus of FIG. 1.

FIG. 3 provides a schematic illustration of the apparatus of FIG. 1. The apparatus 100 includes a central processor 120 configured to control operation of the apparatus 100. The central processor 120 is coupled to a status detection 122 module. The status detection module 122 may be coupled to, for example, the magnetic sensors 114 and may use input from the magnetic sensors 114 to determine, for example, the identity of the book, the page to which the book is open or other such information.

The central processor 120 is further coupled to the video displays 116, 118. In this regard, the central processor 120 may control the content (e.g., images, video, graphics, etc.) to be displayed on the video displays 116, 118. Further, in the case the video displays 116, 118 include touch screens, the central processor 120 may be configured to receive and process inputs received through the video displays 116, 118. In other embodiments, the central processor 120 may be coupled to other input devices, such as a keyboard.

The apparatus 100 may further include a radio interface 124 and an antenna 126 configured to allow the apparatus 100 to communicate with one or more other electronic devices. Again, the radio interface 124 is coupled to the central processor 120 to allow the central processor 120 to control the communication and to process incoming and outgoing communication signals.

Figure 4:
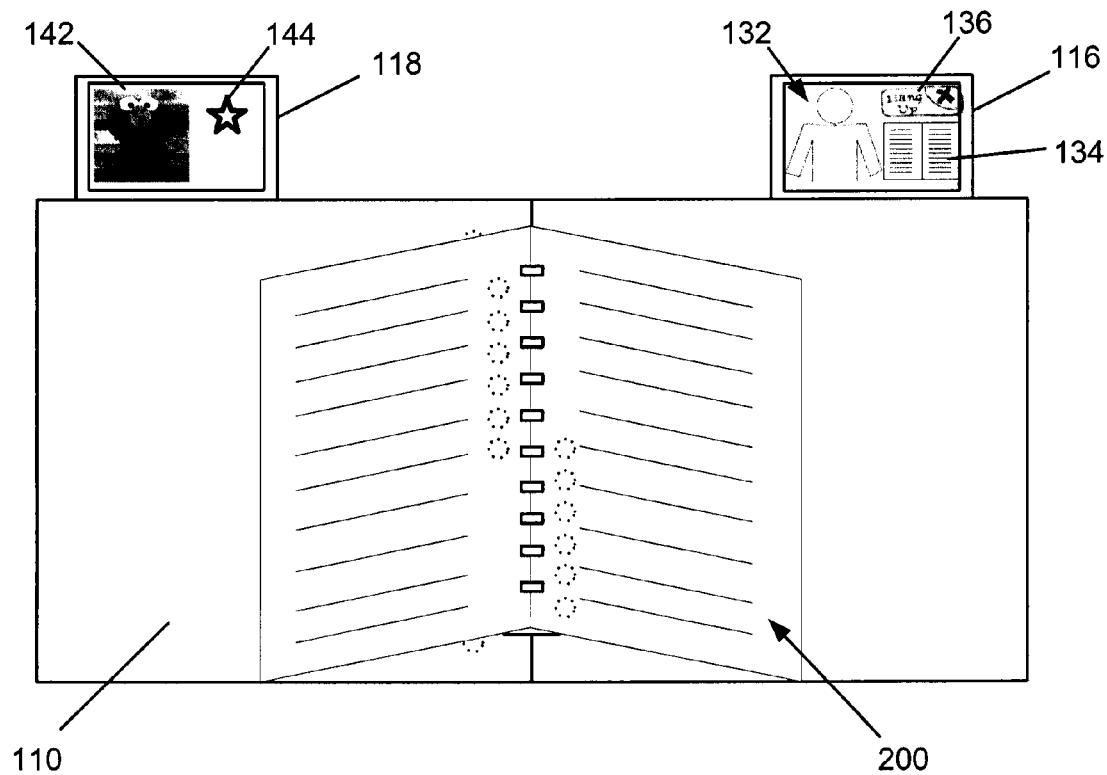
FIG. 4 illustrates the apparatus of FIG. 1 functioning with the book of FIG. 2.

Referring now to FIG. 4, the apparatus 100 of FIG. 1 is illustrated as functioning with the book 200 of FIG. 2. As described above, the book 200 is received by the book frame 110 by positioning of the book binding in the receptacle. In accordance with embodiments of the present invention, the apparatus 100 may communicate with another communication device, thereby allowing the user of the remote device to participate in the reading of the book. Thus, for example, a travelling parent or a remote grandparent may be able to read a book with a child while interacting with the child.

In one embodiment, a communication session may be established between the apparatus 100 and one or more remote devices. The remote devices may be similar to the apparatus 100 or may be a completely different type of device, such as that described below with reference to FIG. 5. The communication session may be any of a variety of sessions, such as a videoconference session, for example.

Once the communication session is established, the user of the apparatus 100 may be able to see remote users 132 on the video display 116. In various embodiments, the apparatus 100 may also include a camera (not shown) to allow the remote users to view the user of the apparatus 100. In some embodiments, instead of live pictures of the remote users 132, photographs of the remote users may be displayed. The photographs may be previously stored on the apparatus or may be accessed by the apparatus from the remote devices or another source.

In addition to the images of the remote users 132, the video display 116 may also present an image 134 indicative of the pages being viewed by the remote users. In the embodiment illustrated in FIG. 4, this image 134 is a graphic image of the page. In other embodiments, the image 134 may be a page number or another indicator of the content being viewed by the remote user.

Further, the video display 116 may include icon 136 allowing the user to access or execute another function. For example, in the embodiment illustrated in FIG. 4, the icon 136 may allow the user to disconnect, or hang up, the communication session. Other functions available through such icons may include initiating a communication session with a selected remote user or accepting an invitation from a remote device for establishment of a communication session. In this regard, a contact list may be made available for selection of a remote user.

In accordance with embodiments of the illustrated embodiment, the video display 118 may provide the user with a display of a character 142. The character 142 may be an animated character, a live-action character, a puppet of any other such character, collectively referred to herein as animated characters. The character 142 may be represented as a still image or, preferably, a moving image from, for example, a video clip. In addition, the video display 118 may provide an icon 144, such as a star or a light bulb, for selection by the user to select a function. In one embodiment, the icon 144 may appear at various points based on the sensed content or status of the book 200. Selection of the icon 144 may cause a video clip of the character 142 to be launched.

Figure 5:
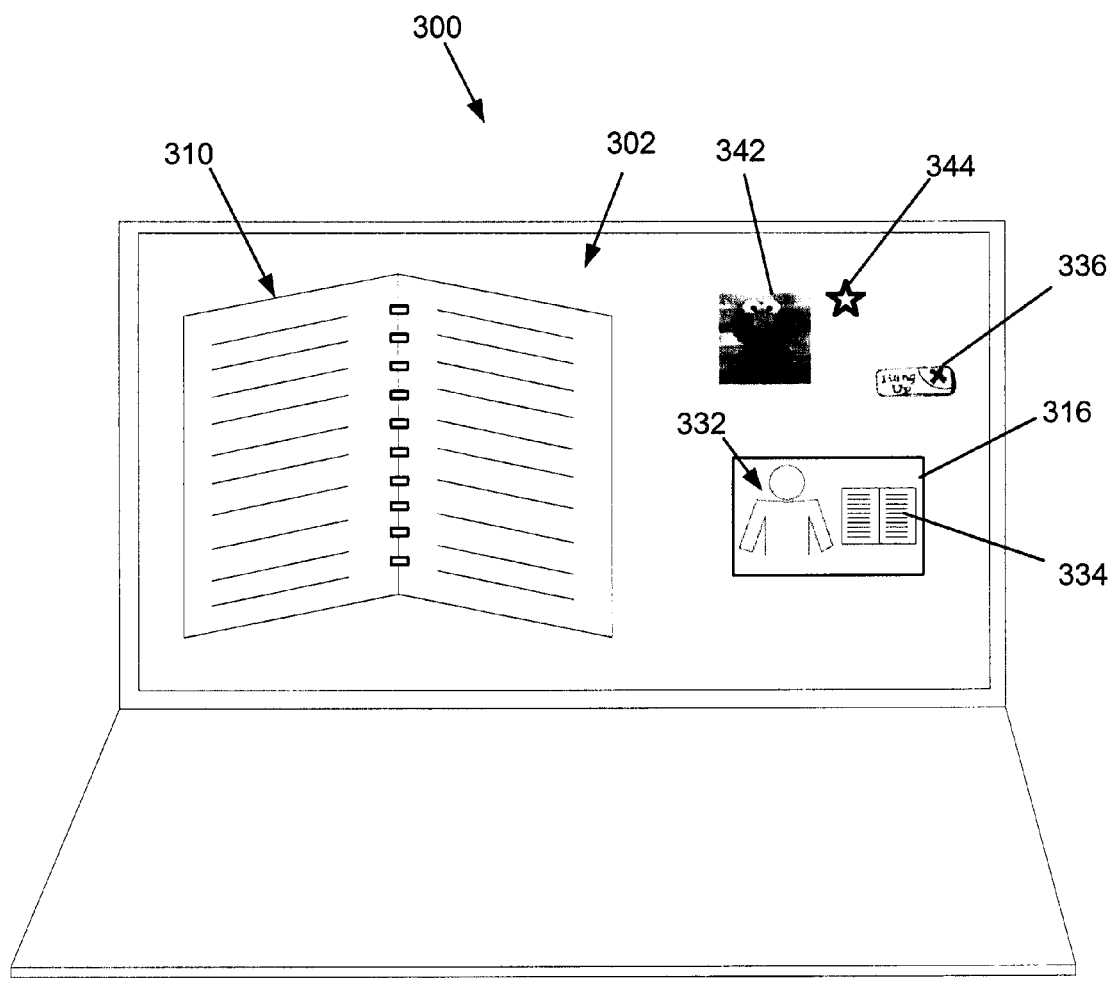
FIG. 5 illustrates an apparatus in accordance with another embodiment of the present invention.

FIGS. 2-4 illustrate the apparatus 100 with a physical book 200. In other embodiments, the book 200 may replaced with a virtual object, such as an electronic book. One such embodiment is illustrated in FIG. 5. In the embodiment of FIG. 5, the apparatus 100 is replaced with a computing device such as a laptop computer 300. Those skilled in the art will understand that any other computing or communication device may be used as well and is contemplated within the scope of the present invention.

In the embodiment of FIG. 5, a software application running on the laptop computer 300 may provide for the use of a digital, or electronic, book 310 displayed on a monitor 302. The digital book may be displayed as a graphical image of the physical book, a scroll or a document in any of a variety of word processing utilities, for example. Further, in place of the magnetic sensors of the embodiment of FIGS. 2 and 4, the embodiment of FIG. 5 may use software to determine the status of the book 310. As noted above, the status may include the identity of the book the page number of the book or other parameter indicative of the content being viewed, for example.

In addition to the electronic book 310, the user may be presented with visual presentations of the remote user 332 and the content being viewed by the remote user 334 in a window 316. Further, the character 342, and icons 344, 336 may also be displayed on the monitor 302 in conjunction with the book 310.

Thus, in accordance with embodiments of the present invention, a communication session may allow a child to use the apparatus to read a book with a remote user, such as a traveling parent or a remote grandparent. In this regard, embodiments of the present invention allow two users to interact remotely with each other and an object, such as a book.

In one embodiment, the invention allows a live communication session between a remote user and a local user. In another embodiment, the invention allows an asynchronous communication session between the remote user and the local user. In this embodiment, the remote user may create a record of a session, such as reading a book for the local user, and later send this recording to the local user's device. The local user may then watch and/or listen to the recording of the remote user's session. In another embodiment, the invention may cause the recording to play based on changes to the status of the local book object. For example, recordings of individual book pages may be played when the local user turns his book to different pages.

In this regard, the local device may receive a recorded session from the remote device. The session may include a series of indicators, each indicator corresponding to a different status of the object. For example, each indicator may correspond to a different page of the book. The recorded session may further include audio and video content associated with each of the one or more statuses of the object. This audio and video content may include, for example, the adult reading the book or commenting on the particular page of the book. The local device may detect the current status of the local object and, accordingly, play the audio and video content associated with the detected current status of the object.

In another embodiment, the invention allows for a local mode of operation. In this embodiment, a user may access a previously recorded session. In this regard, an audio and video session of the reading may be recorded for later reply on the device. In this regard, during the initial reading, a parent may read to a child or may read alone. In either case, the embodiments of the invention allow for later viewing by the child. During the initial reading, audio and video content of the reading may be recorded. Different portions of the audio and video content may be marked, tagged or otherwise associated with the status of the book (e.g., page number). As noted above, the association may include detection of the status of the book. In one embodiment, the audio and video content is recorded as a single session with different portions associated with different pages, for example.

When the child wishes to later read the book with the adult, the device may operate in a local mode and replay the recorded audio and video content. Again, the status of the book may be detected, and the portion of the audio and video content associated with the detected status may be played.

Figure 6:
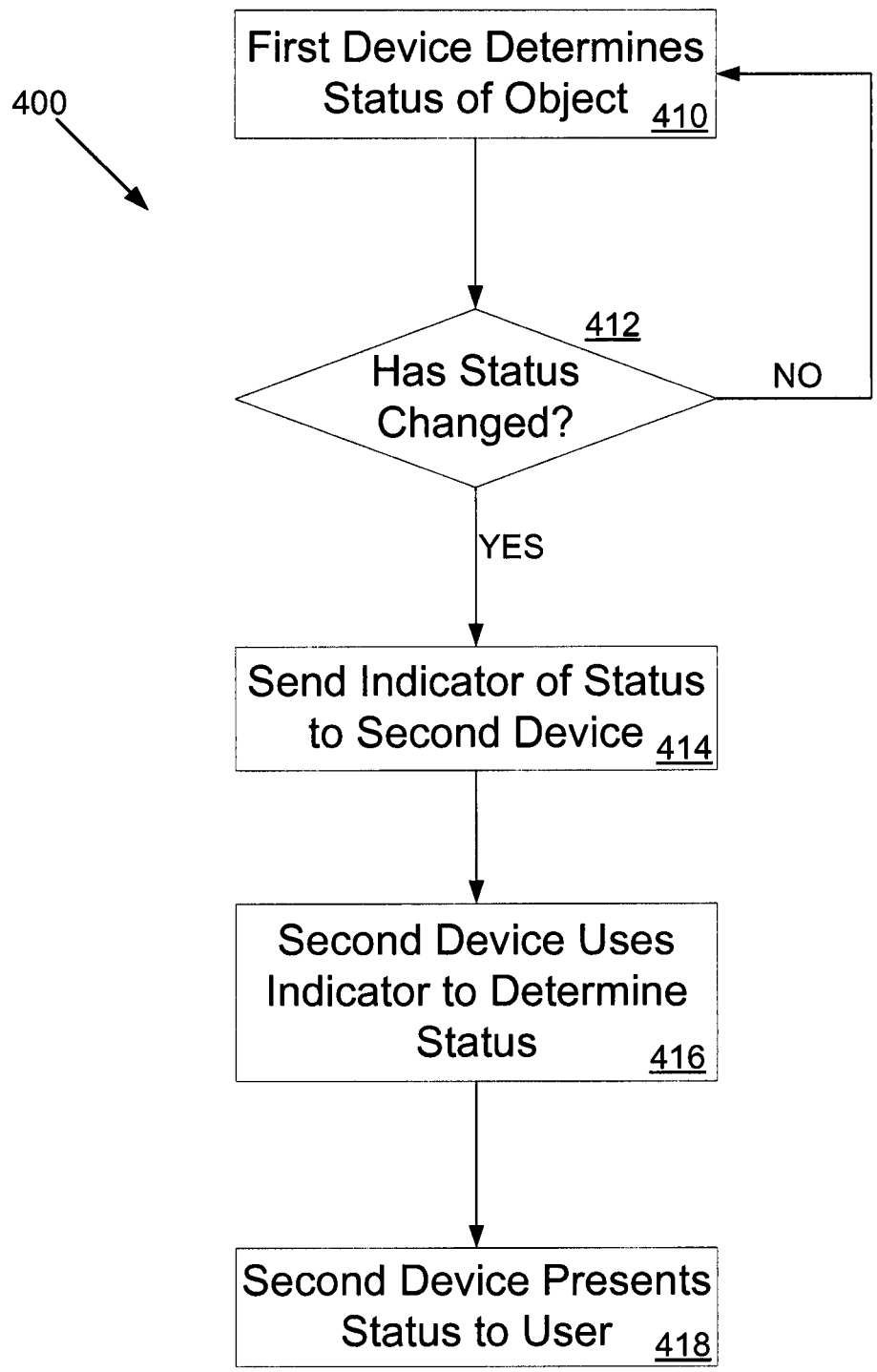
FIG. 6 is a flow chart illustrating a process in accordance with an embodiment of the present invention.

Referring now to FIG. 6, a flow chart illustrates a process 400 in accordance with an embodiment of the present invention. The process 400 may be applied to a device, such as the apparatus 100 with the book frame 110 and a book 200 or another communication device with an electronic book, as illustrated in FIG. 5. The illustrated process 400 shows certain steps. However, those skilled in the art will understand that other steps may be implemented before the process 400, after the process 400 or between the various steps of the process 400. For example, in the embodiment illustrated in FIG. 6, the step of establishing a communication session between two devices may be implemented before the process 400.

In the process 400, the first device determines the status of an object (block 410). In this regard, the first device may be the local apparatus, such as the book frame 110 operated by a child. Further, the object may be the book 200, and the status of the object may be the identity of the book, the page number to which the book is open or another identifier of the content being viewed by the user. The determination of the status may be achieved in a variety of manners. For example, as described above with reference to FIGS. 1-4, magnetic sensors may be placed in the book frame 110 to detect the status of the book based on magnets located in the pages of the book 200. In other embodiments, radio frequency identification (RFID) tags and sensors, magnetic switches (reed switches), hall effect sensors, Near Field Communication (NFC) tags and sensors or light sensors may be used instead of the magnets. In still other embodiments, a camera directed at the book may be used to capture an image of the content being viewed by the user or to read a barcode of the book or page. The captured image may be used to identify (or detect) the content being viewed. Those skilled in the art will understand that numerous other ways of determining the status of the object are possible and are contemplated within the scope of the present invention.

In one embodiment, one or more magnets and sensors may be used to uniquely identify a book from among a collection of books. In this regard, two or more sensors and magnets on the last page of the book may be reserved to distinguish among three or more possible books.

In other embodiments, RFID tags with known ID's may be used to identify a book. In still other embodiments, a camera may be used to capture an image, and software may compare the visual appearances of different pages to a collection of known book pages.

At block 412, a determination may be made as to whether the status of the object has changed. In this regard, the determination may be made based upon a continuous or regular monitoring of the status. Alternatively, a trigger may be activated upon a change in the status of the object. If the determination at block 412 is made that no status change has occurred, the process may return to block 410. On the other hand, if the determination is made that the status has changed, the process proceeds to block 414.

At block 414, the first device sends an indicator of the determined status of the object. The communication session may be in any of a variety of formats and protocols such as, for example, WiFi, Bluetooth, GSM or wired communications such as Ethernet. Further, rather than transmitting the actual status (e.g., content being viewed), the indicator sent to the second device may be sufficient to allow the second device to the status of the object. For example, the indicator may be a page number, a line number, or a bookmark number associated with the content being viewed. The remote device may be capable of displaying an image of the remotely displayed page by correlating the indicator to a database of images associated with known books and pages. The database of known books and pages may be shared (e.g., stored on a network server), or multiple copies of the database may exist locally on the connected devices. In the case of a digital book, a book ID and page ID information may be sensed by determining the software state of the program which represents and controls the state of the digital book.

Once the second device receives the indicator, the second device may determine the status of the object that was determined by the first device (block 416). In this regard, the second device may include, or have access to, software, data or database to enable the second device to use the received indicator to determine the status. In the embodiments illustrated in FIGS. 1-5, the first device (being operated by the child) may transmit an indicator of the book, portion of the book, the page number of the book or another parameter associated with the content being viewed, to the second device (being operated by a remote adult). The second device may then use the indicator to determine the content being viewed by the child.

The status may then be presented to the user of the second device (block 418). In this regard, the adult may be presented with an image of the book pages being viewed by the child, such as image 134 (FIG. 4) or image 334 (FIG. 5). In other embodiments, the second device may merely present a page number to the adult. The adult may then manually turn the pages of the book, either physical or virtual, to the presented page number. Of course, other parameters associated with the content being viewed may be presented to the user and are contemplated within the scope of the present invention.

As described above, an animated character 142, 342, such as Sesame Street®'s Elmo, may be presented to the user. In this regard, a software agent may be implemented to allow and encourage interaction by a child reading the book. The software agent may use the animated character to make aspects of the user interface intuitive to children by instructing them verbally with a familiar character. Further, during a communication session with one or more other devices, instances of the animated character may be synchronized on all devices. In this regard, an indicator of the instance of the animated character may be sent to the remote devices to allow such synchronization. The indicator may be indicative of, for example, a video clip of the animated character stored on the device.

Live action video footage of the animated character may be used as display elements of the software program. The animated character may guide the user through user interface actions such as making a phone call or answering a call to establish the communication session. Further, the animated character may provide programmatic feedback to the user, such as asking the user questions about content being viewed or read. For example, the animated character may ask questions about a book the child is reading. Since the system knows which page the child is reading, the animated character may ask questions and make comments that pertain to the content currently being viewed.

The animated character may be an element of the user interface and represents software state by speaking and visually providing queues to the user. In one example embodiment, a single movie may be provided which includes a variety of live action video footage of the animated character. The software may dynamically play different clips of video footage in response to different software states. For example, when a book is opened, a video clip may be played which shows the animated character saying to the user: "Hello, let's read a book."

In one example, a child opens the book 200 on the book frame 110 (see FIG. 4) to read with a remote grandparent. Upon opening the book, the software agent is in a local, asynchronous mode in which the animated character reacts only to local input and local software state. For example, the animated character may ask: "Who do you want to read with today?" The child may be offered a selection of remote users though, for example, a series of pictures on a touch screen. The child may touch a photograph of his grandmother, which will initiate a video call to the grandparent. For incoming calls, the animated character may instruct the child to "answer the phone please." In this regard, a photograph of the caller (e.g., grandma) may be presented to the child. When the communication session is established, the animated character may say "hooray, we're all going to read together!"

In another example, the method may be used in a non-networked mode using the software agent to scaffold interaction with the local object. For instance, a child may read a book and the animated character may make comments about the book to the child, or read the book to the child.

Once the communication session is established, the software agent shifts to a synchronous mode in which the animated character reacts to input and software state of both connected systems. In this regard, it is noted that each of the devices in the communication session may provide the appropriate software to allow exchange of information (e.g., indicators) to allow functioning in synchronous mode. In one embodiment, input to a single animated character (either the one on the local device or the one on the remote device) will cause both animated characters to output the same result. At various times, the software agent may present an icon, such as a star 144 (FIG. 4), a light bulb or a thought bubble, to signify that the animated character may be activated. If the user touches the icon, the animated character on all devices in the communication session may say the same thing to their respective users. In this regard, the same video clip may be played at each device. For example, each device may play a video clip showing the animated character asking, "How many knots can you count on this page?"

Even though the users may not have identical interfaces, the connected agents will output similar results. For example, one user may have a physical book, while the other user may have a virtual, electronic book.

In various embodiments, different users may have different input controls. For example, an adult may have "puppeteering" controls that allow the adult user to manipulate the animated character in ways the child is not able to do. For example, the adult user may be able to push buttons to make Elmo say "yes" or "no" in response to questions she asks him. The adult user may also be allowed to ask the animated character a question, then trigger the animated character to answer yes in a synchronized manner. Since the child does not have access to the "yes" controls, the adult user can create the illusion that the animated character is acting intelligently.

In one embodiment, the software agent includes multiple copies of a single software agent which are distributed to the individual devices. A single agent may have an autonomous behavior when one device is not communicating with other devices, and in which the agent's output becomes synchronized with other agents when multiple agents are communicating over a network. The system of software agents may include two or more copies of a single agent. As used herein, the software agent may include a user interface featuring an animated character. As used herein, an "animated character"

may be a live-action video of a character (e.g., a puppet, live-action video of person, a cartoon character, audio content (a character voice), a physical object with character qualities with embedded speaker for sound output (e.g., a doll, plush toy, pillow with a face on it, etc.).

In various embodiments, a single copy of the software may transfer local input and state information from the local agent to the remote agent. For example, when the user activates the local agent, the software determines that a certain agent response will be triggered, and then transmits to the remote agent information that the certain response will be triggered. The local agent will wait for the data to transfer and will then play the response locally. The remote agent will receive the data and will synchronously play the same response on the remote device. This creates the sense among distributed users that all users are interacting with the same agent.

Once multiple devices are connected in a communication session, user input to a single agent may cause the user's view of a single agent and connected users' views of connected agents to output the same result.

The use of a software agent in the user interface supports any user (even very young children or illiterate users) to use the device. Synchronization of multiple connected agents' states allows multiple users to treat multiple agents as views of a single agent. Local data may be cached locally on multiple devices so that low bandwidth is used to coordinate the agents' behaviors in real-time.

The system also uses a conversational agent to scaffold interaction (e.g., discussion) between parties. This can help focus users' attention towards a shared activity or document.

Figure 7:
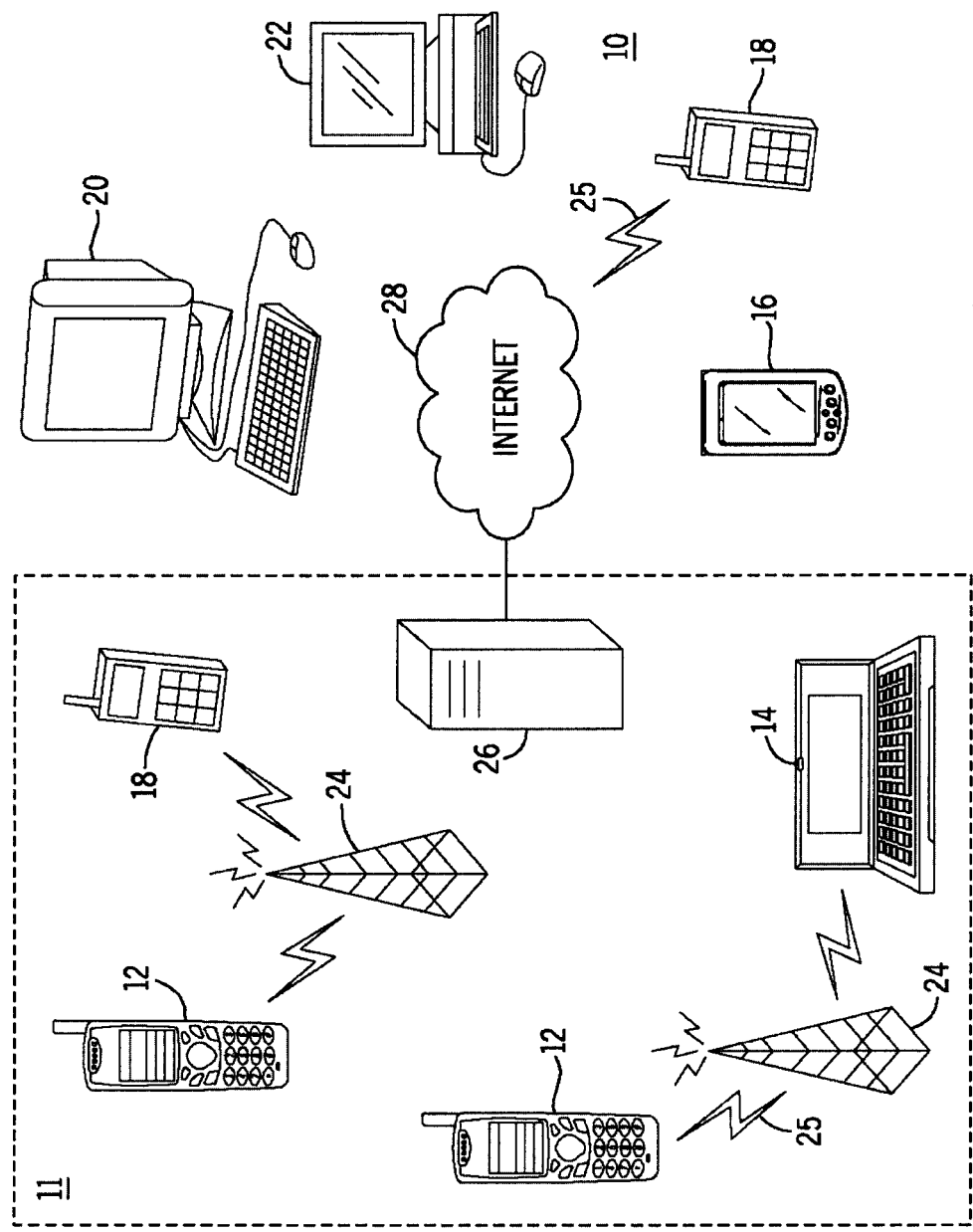
FIG. 7 is an overview diagram of a system within which various embodiments of the present invention may be implemented.

FIG. 7 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 7 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 8:
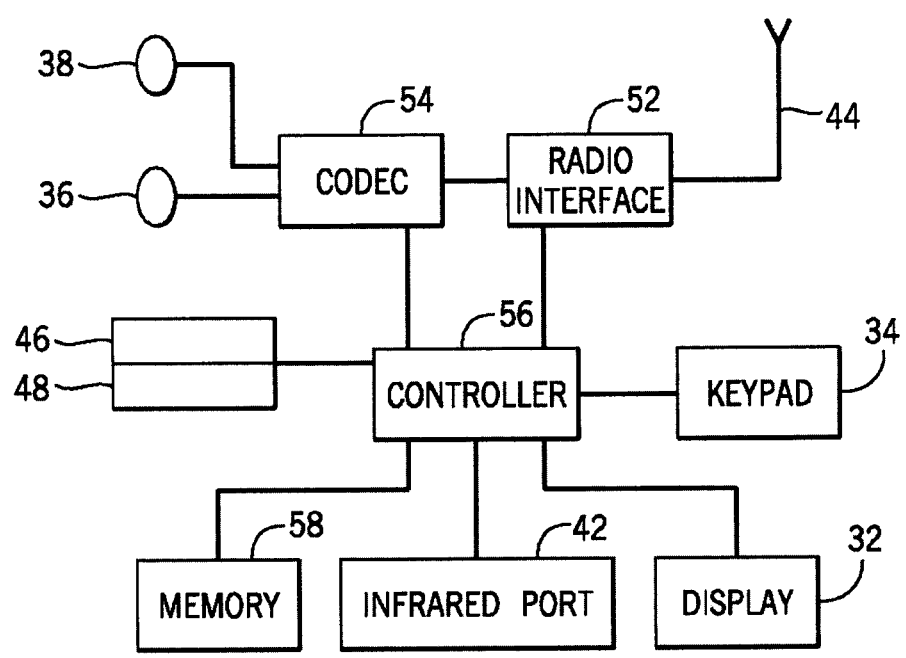
FIG. 8 is a schematic representation of the circuitry which may be included in an exemplary electronic device which may be utilized in accordance with the various embodiments of the present invention.

FIG. 8 shows one representative electronic device which may be used as a network node in accordance to the various embodiments of the present invention. It should be understood, however, that the scope of the present invention is not intended to be limited to one particular type of device. The electronic device of FIG. 8 may includes a housing, a display in the form of a liquid crystal display, a keypad 34, a microphone 36, an ear-piece 38, a battery, an infrared port 42, an antenna 44, a smart card 46 in the form of a UICC according to one embodiment, a card reader 48, radio interface circuitry 52, codec circuitry 54, a controller 56 and a memory 58. The above described components enable the electronic device to send/receive various messages to/from other devices that may reside on a network in accordance with the various embodiments of the present invention. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
   determining a status of a media object on a first device, the status of the media object comprising an identifier of content in the media object viewable by a user;
   causing sending of an indicator of the status of the media object to a remote device, the indicator being configured to allow the remote device to present the status of the media object; and
   causing display of animated content based on the determined status of the media object, wherein displaying animated content includes providing commentary or asking questions related to content associated with the media object; and
   causing establishment of at least one of audio or video communication with the remote device.

2. The method of claim 1, wherein the at least one of audio or video communication is part of a video conference session.

3. The method of claim 1, wherein the at least one of audio or video communication with the remote device is established over a network.

4. The method of claim 1, wherein the media object is a physical object.

5. The method of claim 4, wherein the media object is a book, and the status is associated with a page number of the book.

6. The method of claim 1, wherein the media object is a virtual object.

7. The method of claim 6, wherein the media object is an electronic book.

8. The method of claim 1, wherein the status is a physical state of the media object.

9. The method of claim 1, wherein the media object is a book, and wherein the status is a page number of the book.

10. The method of claim 1, wherein the media object is a book, and wherein the status is selected content in the book.

11. An apparatus, comprising:
    at least one processor; and
    at least one memory including computer program code, the at least one memory and the computer code configured to, working with the at least one processor, cause the apparatus to perform at least the following:
    determining a status of a media object on a first device, the status of the media object comprising an identifier of content in the media object viewable by a user;
    causing sending of an indicator of the status of the media object to a remote device, the indicator being configured to allow the remote device to present the status of the media object; and
    causing display of animated content based on the determined status of the media object, wherein displaying animated content includes providing commentary or asking questions related to content associated with the media object; and
    causing establishment of at least one of audio or video communication with the remote device.

12. The apparatus of claim 11, wherein the media object is a book and the apparatus further comprises a receptacle for receiving the book therein.

13. The apparatus of claim 11, comprising one or more sensors configured to determine the status of the book.

14. A computer program product comprising at least one non-transitory computer-readable medium having computer-executable program code portions stored therein, the computer-executable program code portions comprising program code instructions that, when executed, cause an apparatus to:
    determine a status of a media object on a first device, the status of the media object comprising an identifier of content in the media object viewable by a user;
    cause sending of an indicator of the status of the media object to a remote device, the indicator being configured to allow the remote device to present the status of the media object; and
    cause display of animated content based on the determined status of the media object, wherein displaying animated content includes providing commentary or asking questions related to content associated with the media object; and
    cause establishment of at least one of audio or video communication with the remote device.

15. The method of claim 14, wherein the at least one of audio or video communication is part of a video conference session.

16. The method of claim 14, wherein the media object is a physical object.

17. The method of claim 14, wherein the media object is an virtual object.

18. The method of claim 14, wherein the status is a physical state of the media object.

* * * * *